(12) United States Patent
Suzuki et al.

(10) Patent No.: US 10,254,197 B2
(45) Date of Patent: Apr. 9, 2019

(54) OPTICAL FIBER MONITORING SYSTEM

(71) Applicants: Hitachi Metals, Ltd., Tokyo (JP); NTT Communications Corporation, Tokyo (JP)

(72) Inventors: Kanako Suzuki, Tokyo (JP); Koki Hirano, Tokyo (JP); Mikio Ohkoshi, Tokyo (JP); Wataru Ohnuki, Tokyo (JP); Yoshihiro Nakatani, Tokyo (JP); Takao Nishikawa, Tokyo (JP); Toshiyuki Suzuki, Saitama (JP); Toshio Sakai, Tokyo (JP)

(73) Assignees: HITACHI METALS, LTD., Tokyo (JP); NTT COMMUNICATIONS CORPORATION, Tokyo (JP)

( * ) Notice: Subject to any disclaimer, the term of this patent is extended or adjusted under 35 U.S.C. 154(b) by 0 days.

(21) Appl. No.: 15/802,165

(22) Filed: Nov. 2, 2017

(65) Prior Publication Data

US 2018/0128709 A1    May 10, 2018

(30) Foreign Application Priority Data

Nov. 4, 2016 (JP) ................................ 2016-215932

(51) Int. Cl.
*G01N 21/00* (2006.01)
*G01M 11/00* (2006.01)

(52) U.S. Cl.
CPC ............ *G01M 11/33* (2013.01); *G01M 11/31* (2013.01)

(58) Field of Classification Search
CPC .............................. G01M 11/31; G01M 11/33

USPC ........................................................ 356/73.1
See application file for complete search history.

(56) References Cited

U.S. PATENT DOCUMENTS

| 2003/0215235 | A1 | 11/2003 | Norizuki et al. | |
|---|---|---|---|---|
| 2007/0230872 | A1* | 10/2007 | Suzuki ................ | G02B 6/4214 385/48 |
| 2013/0087694 | A1* | 4/2013 | Creeden ............... | G01J 1/0425 250/227.11 |

(Continued)

FOREIGN PATENT DOCUMENTS

| JP | H 11-074912 A | 3/1999 |
|---|---|---|
| JP | 2001-024590 A | 1/2001 |

(Continued)

*Primary Examiner* — Sunghee Y Gray
(74) *Attorney, Agent, or Firm* — McGinn I. P. Law Group, PLLC.

(57) ABSTRACT

An optical fiber monitoring system monitors an inter-building optical fiber connecting a first building and a second building. The optical fiber monitoring system includes a first visualization panel provided in the first building and optically connected to an one end of the inter-building optical fiber, a second visualization panel provided in the second building and optically connected to an other end of the inter-building optical fiber, and a monitoring light source provided in the first building to input a monitoring light into the inter-building optical fiber. The first visualization panel includes a first photosensor that partially leaks the monitoring light inputted into the inter-building optical fiber from the monitoring light source and detects an amount of a leaked light. The second visualization panel includes a second photosensor that partially leaks a light from the inter-building optical fiber and detects amount of a leaked light.

9 Claims, 6 Drawing Sheets

(56) References Cited

U.S. PATENT DOCUMENTS

2015/0288447 A1 10/2015 Suzuki et al.
2016/0356670 A1* 12/2016 Brillhart ............ G01M 11/3136

FOREIGN PATENT DOCUMENTS

| JP | 2004-048656 A | 2/2004 |
| JP | 2015-200707 A | 11/2015 |

* cited by examiner

OPTICAL FIBER MONITORING SYSTEM

The present application is based on Japanese patent application No. 2016-215932 filed on Nov. 4, 2016, the entire contents of which are incorporated herein by reference.

BACKGROUND OF THE INVENTION

1. Field of the Invention

The invention relates to an optical fiber monitoring system.

2. Description of the Related Art

Inter-building optical fibers (optical fiber cables) are laid between buildings of data center, etc., and fiber-optic communication is performed between the buildings through the inter-building optical fibers.

Since the inter-building optical fibers are routed in outdoor environments, faults such as local bend or wire break occur due to wind and rain, etc. Thus, the health (existence of faults) of inter-building optical fibers is regularly inspected. The health of inter-building optical fibers is also inspected when the status of inter-building optical fibers are changed from not in use (standby) to in use.

JP 2015/200707 discloses a prior art that may be related to the present invention.

SUMMARY OF THE INVENTION

In inspecting the health of inter-building optical fibers, however, it is necessary to send workers to two buildings respectively connected by the inter-building optical fibers to check the existence of faults by measuring e.g. optical loss of inter-building optical fibers which are going to be used, so that it takes a lot of time and efforts.

It is an object of the invention to provide an optical fiber monitoring system that facilitates the check of the health of the inter-building optical fibers.

According to an embodiment of the invention, an optical fiber monitoring system for monitoring an inter-building optical fiber connecting a first building and a second building comprises:

a first visualization panel provided in the first building and optically connected to an one end of the inter-building optical fiber;

a second visualization panel provided in the second building and optically connected to an other end of the inter-building optical fiber; and a monitoring light source provided in the first building to input a monitoring light into the inter-building optical fiber, wherein the first visualization panel comprises a first photosensor that partially leaks the monitoring light inputted into the inter-building optical fiber from the monitoring light source and detects an amount of a leaked light, and wherein the second visualization panel comprises a second photosensor that partially leaks a light from the inter-building optical fiber and detects amount of a leaked light.

Effects of the Invention

According to an embodiment of the invention, an optical fiber monitoring system can be provided that facilitates the check of the health of the inter-building optical fibers.

BRIEF DESCRIPTION OF THE DRAWINGS

Next, the present invention will be explained in more detail in conjunction with appended drawings, wherein:

FIGS. 1A and 1B are schematic configuration diagrams illustrating an optical fiber monitoring system in an embodiment of the present invention, wherein FIG. 1A shows a state in which an inter-building optical fiber is not used and FIG. 1B shows a state in which the inter-building optical fiber is used;

FIGS. 3A and 3B are diagrams illustrating a first visualization panel, wherein FIG. 3A is a perspective view and FIG. 3B is an exploded perspective view;

DETAILED DESCRIPTION OF THE PREFERRED EMBODIMENTS

Embodiment

An embodiment of the invention will be described below in conjunction with the appended drawings.

Figure 1A:
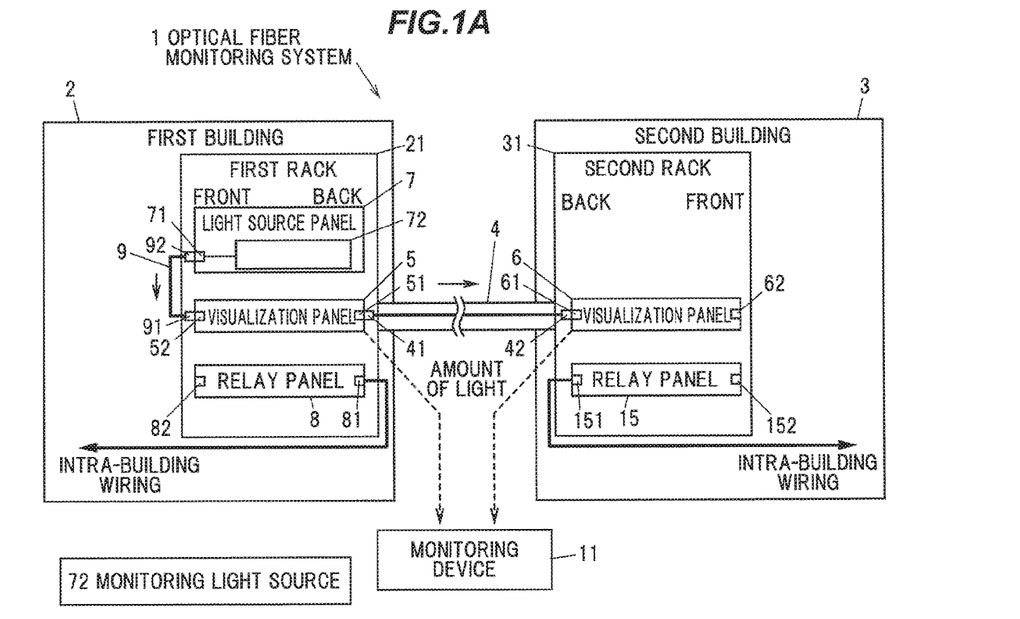
Figure 1B:
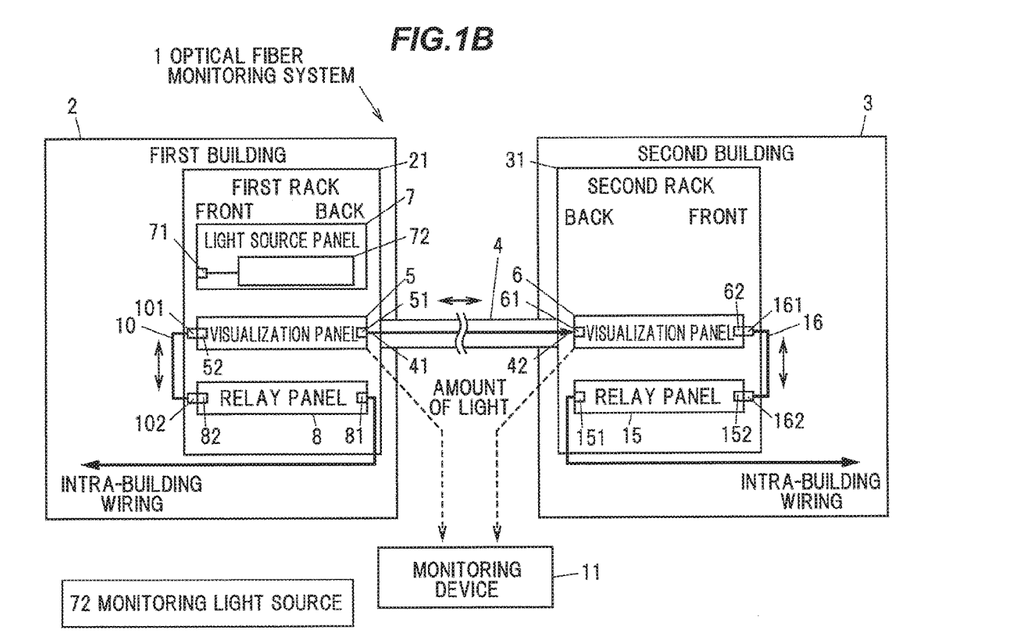
Figure 2A:
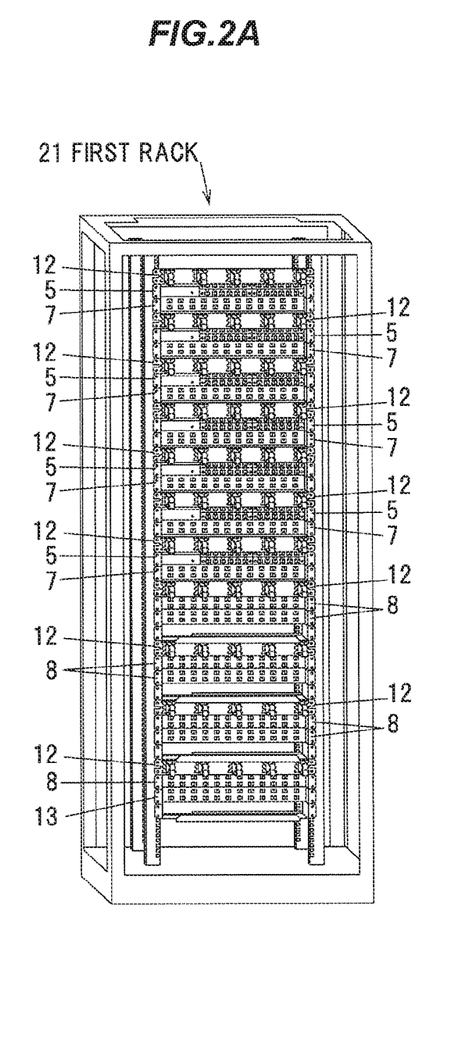
FIG. 2A is a diagram illustrating an appearance of a first rack.
Figure 2B:
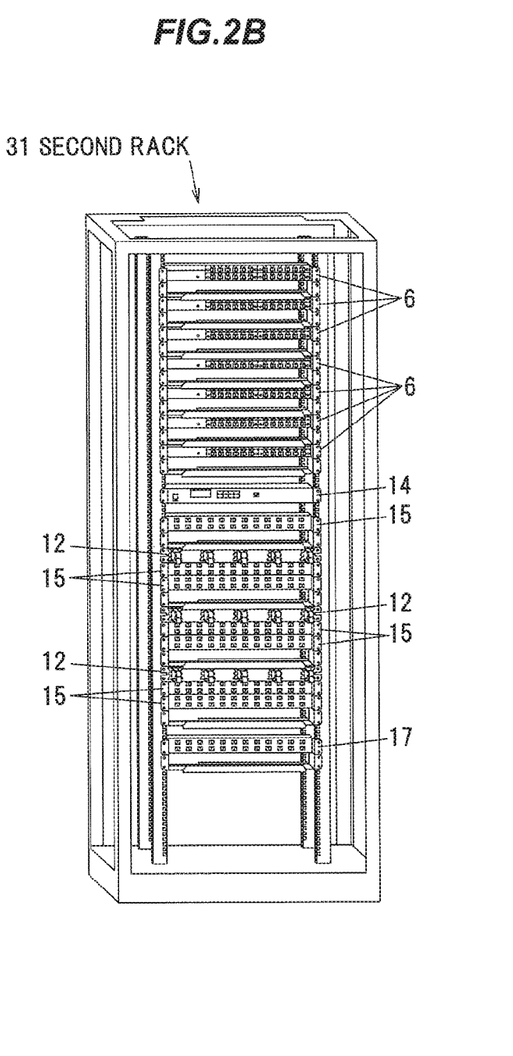
FIG. 2B is a diagram illustrating an appearance of a second rack.

FIGS. 1A and 1B are schematic configuration diagrams illustrating an optical fiber monitoring system in the present embodiment, wherein FIG. 1A shows a state in which an inter-building optical fiber is not used and FIG. 1B shows a state in which the inter-building optical fiber is used. FIG. 2A is a diagram illustrating an appearance of a first rack and FIG. 2B is a diagram illustrating an appearance of a second rack.

As shown in FIGS. 1A to 2B, an optical fiber monitoring system 1 monitors inter-building optical fibers 4 connecting a first building 2 to a second building 3. The first building 2 and the second building 3 are, e.g., data centers (or office buildings containing data centers).

The first building 2 is communicably connected to the second building 3 by plural inter-building optical fibers 4. In this example, the two buildings 2 and 3 are connected by one thousand inter-building optical fibers 4. The inter-building optical fiber 4 used here is a single-mode optical fiber which is suitable for long-distance transmission. The length of the inter-building optical fiber 4 is, e.g., up to about 80 km.

The optical fiber monitoring system 1 has first visualization panels 5, second visualization panels 6 and light source panels 7. The first visualization panels 5 are provided in the first building 2 and are optically connected to ends of the inter-building optical fibers 4. The second visualization panels 6 are provided in the second building 3 and are optically connected to the other ends of the inter-building optical fibers 4. The light source panels 7 are provided in the first building 2 and each mount monitoring light sources 72 which inject monitoring light into the inter-building optical fibers 4.

Description of the First Building 2

The first visualization panel 5 is provided basically to detect and indicate communication status but, in the present embodiment, further has a function of detecting an amount of light and transmitting a signal corresponding thereto.

In detail, the first visualization panel 5 has plural first optical connector ports 51 to be connected to optical connectors 41 attached to ends of the inter-building optical fibers 4, and plural second optical connector ports 52 optically connected to the first optical connector ports 51. An optical connector 91 (see FIG. 1A) attached to one end of a light source connection optical fiber 9 extending from the light source panel 7 or an optical connector 101 (see FIG. 1B) attached to one end of a wire connection optical fiber 10 extending from a relay panel 8 is connected to the second optical connector port 52. The details will be described later.

Figure 3A:
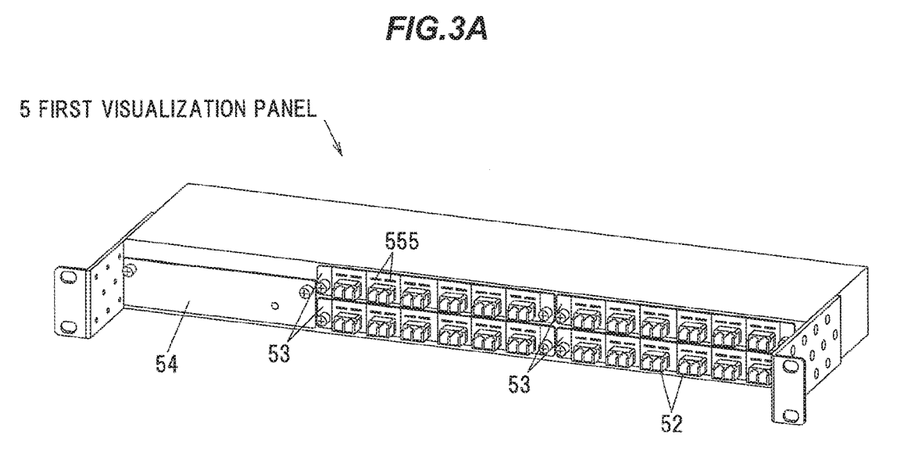
Figure 3B:
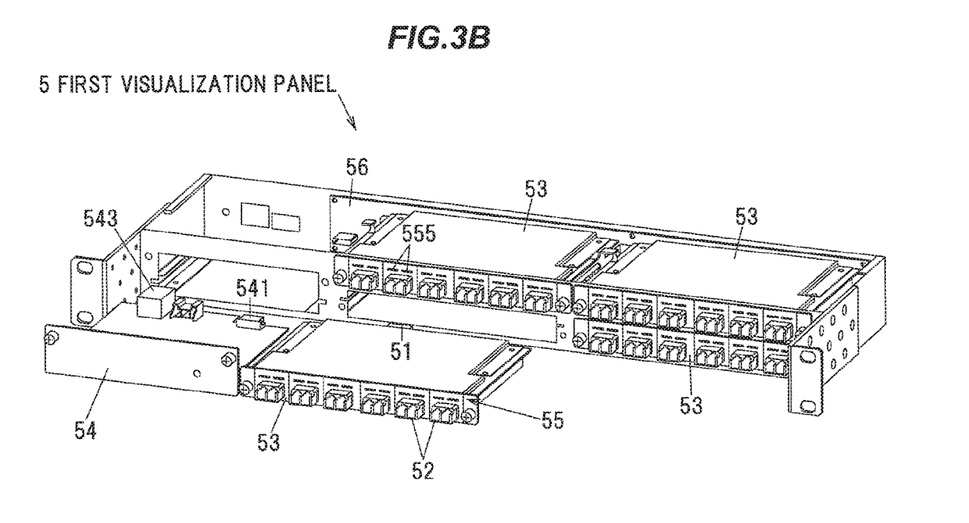

As shown in FIGS. 3A and 3B, LC duplex optical connectors each having two integrated ports (optical receptacles) are used as the second optical connector ports 52 in the present embodiment. Meanwhile, MPO connectors (receptacles) are used as the first optical connector ports 51 in the present embodiment. The second optical connector ports 52 are arranged in rows on the front surface of the first visualization panel 5, and the first optical connector ports 51 on the back surface of the first visualization panel 5.

In the present embodiment, the first visualization panel 5 has four visualization modules 53 and a master board module 54. Each visualization module 53 has twelve second optical connector ports 52 and one shared first optical connector port 51 (for twelve lines), and each second optical connector port 52 is optically connected to the first optical connector port 51 inside the visualization module 53. In other words, in the present embodiment, one first visualization panel 5 can support forty-eight lines.

Each visualization module 53 is connected, via an electrical connector (not shown), to a circuit board 56 provided on the back side of the first visualization panel 5. The master board module 54 is connected to the circuit board 56 via an electrical connector 541 in the same manner, hence, each visualization module 53 is connected to the master board module 54 via the circuit board 56.

The first visualization panel 5 has first photosensors 55 which partially leak monitoring light injected into the inter-building optical fibers 4 from the monitoring light sources 72 and detect the amount of the leaking light.

Figure 4:
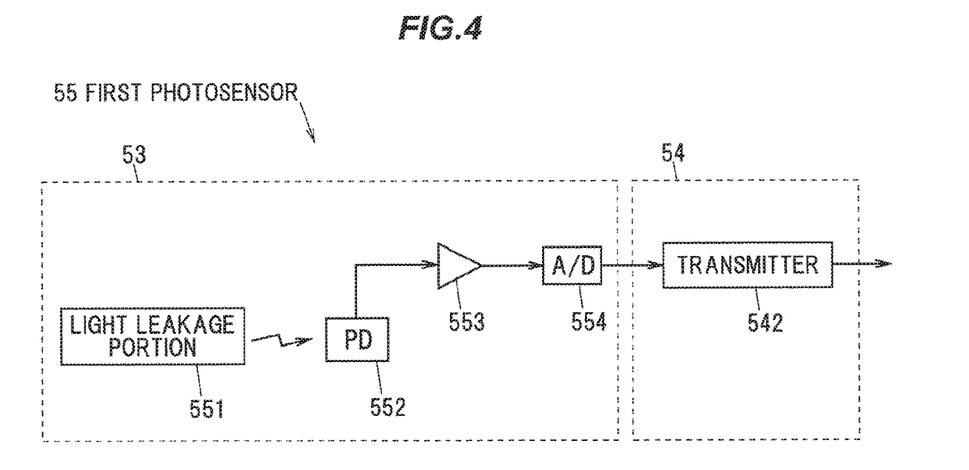
FIG. 4 is a schematic configuration block diagram illustrating a first photosensor.

As shown in FIG. 4, the first photosensor 55 is provided with a light leakage portion 551 which partially leaks light transmitted between the first optical connector port 51 and the second optical connector ports 52, a PD (photodiode) 552 as a light-receiving element for detecting leaking light which leaks through the light leakage portion 551, an amplifier 553 which converts a current signal from the PD 552 into a voltage signal and amplifies the voltage signal, and an A/D converter 554 which converts the voltage signal amplified by the amplifier 553 into a digital signal. A light amount signal converted into a digital signal by the A/D converter 554 is transmitted, via the circuit board 56, to a transmitter 542 mounted on the master board module 54. The detailed configuration of the light leakage portion 551 is not specifically limited, and it is possible to use the light leakage portion 551 formed of, e.g., a fusion splice portion which is provided inside the second optical connector port 52 and at which optical fibers having different core diameters are fusion-spliced. Although FIG. 4 only shows the first photosensor 55 for one line, the first photosensor 55 is provided for each line (each second optical connector port 52).

Referring back to FIGS. 3A and 3B, the first photosensor 55 has an indicator portion 555 which emits light to indicate the communication status when leaking light is detected. In the present embodiment, the indicator portion 555 is formed of a light-emitting diode. The indicator portions 555 are provided respectively above the second optical connector ports 52 so as to one-to-one correspond to the second optical connector ports 52.

As shown in FIG. 3B, the master board module 54 has a communication port 543 to which a communication cable (not shown) is connected. The transmitter 542 sends a light amount signal, which is received from each visualization module 53, to a monitoring device 11 (FIGS. 1A and 1B) through the communication port 543. The light amount signal sent from the transmitter 542 here may be either a signal corresponding to the amount (intensity) of leaking light or a signal corresponding to the amount (intensity) of monitoring light calculated from the amount of leaking light.

The light source panel 7 incorporates plural monitoring light sources 72 of the same number as the inter-building optical fibers 4 connected to the first visualization panel 5 via the first optical connector ports 51, and also has light source-side optical connector port 71 of the same number as the monitoring light sources 72. The light source-side optical connector ports 71 are provided on the front surface of the light source panel 7.

Desirably, light emitted from the monitoring light source 72 is relatively largely lost due to bending of optical fiber (i.e., has a long wavelength). In more detail, it is desirable to use the monitoring light source 72 which emits monitoring light at a wavelength of not less than 1500 nm. The monitoring light sources 72 emitting monitoring light at a wavelength of 1550 nm are used in the present embodiment.

When the inter-building optical fiber 4 is not in use, the optical connector (LC connector) 91 at one end of the light source connection optical fiber 9 is connected to the second optical connector port 52 of the first visualization panel 5 and an optical connector (LC connector) 92 at the other end of the light source connection optical fiber 9 is connected to the light source-side optical connector port 71 of the light source panel 7, as shown in FIG. 1A. Although only one port 52 and one port 71 are shown in FIG. 1A, all ports 52 and 71 are connected by the light source connection optical fibers 9. In addition, in FIG. 2A, the light source connection optical fibers 9 are omitted to simplify the drawing.

Thus, monitoring light emitted from each monitoring light source 72 of the light source panel 7 is incident on the first visualization panel 5 via the light source connection optical fiber 9 and is sent to the inter-building optical fiber 4 from the back side of the first visualization panel 5 (through the first optical connector port 51). At this time, the amount of monitoring light (leaking light) is detected by the first photosensor 55 of the first visualization panel 5 and a corresponding signal is sent to the monitoring device 11. Although the connectors 91 and 92 of the light source connection optical fiber 9 are directly connected to the first visualization panel 5 and the light source panel 7 in FIG. 1A, the first visualization panel 5 and the light source panel 7 do not need to be connected directly and may be connected via, e.g., a relay panel, etc.

In the present embodiment, a first rack 21 is placed in the first building 2, and the first visualization panels 5 and the light source panels 7 having the monitoring light sources 72 are mounted on the first rack 21. Alternatively, the first visualization panels 5 and the light source panels 7 may be mounted on separate racks. In such a case, however, it is necessary to use longer light source connection optical fibers 9 and wiring work may become cumbersome and complicated.

As shown in FIG. 2A, in the present embodiment, seven pairs of first visualization panel 5 and the light source panel 7 are mounted on a single first rack 21 which thus can support three hundred and thirty-six lines. Three first racks 21, which are the same as shown in FIG. 2A, are placed in the first building 2 so as to be able to support one thousand inter-building optical fibers 4, even though the illustration is omitted in FIGS. 1A and 1B. The number of the inter-building optical fibers 4, the number of the first racks 21, the numbers of the first visualization panels 5 and the light source panels 7 mounted on one first rack 21 and the number of lines (the number of the second optical connector ports 52) on each first visualization panel 5, etc., are only examples and are not limited to those shown in the drawings.

In the present embodiment, plural relay panels 8 (for at least three hundred and thirty-six lines) are also mounted on the first rack 21. Wire connectors 81 connected to intra-building wiring as physical wires routed inside the first building 2 are provided on the back surfaces of the relay panels 8, and plural visualization panel-side optical connector ports 82 optically connected to the wire connectors 81 are provided on the front surfaces of the relay panels 8.

When the inter-building optical fiber 4 is in use, the optical connector (LC connector) 101 at one end of the wire connection optical fiber 10 is connected to the second optical connector port 52 of the first visualization panel 5 and an optical connector (LC connector) 102 at the other end of the wire connection optical fiber 10 is connected to the visualization panel-side optical connector port 82, as shown in FIG. 1B. Thus, the intra-building wiring is connected to the inter-building optical fiber 4 via the relay panel 8, the wire connection optical fiber 10 and the first visualization panel 5. Alternatively, the intra-building wiring may be directly connected to the first visualization panel 5 without using the relay panel 8.

In the present embodiment, wire alignment panels 12 are also mounted on the first rack 21 to organize optical fibers (the light source connection optical fibers 9 and the wire connection optical fibers 10) which are connected to the second optical connector ports 52 of the first visualization panels 5. Although one wire alignment panel 12 is provided for one pair of first visualization panel 5 and light source panel 7 and one wire alignment panel 12 for two relay panels 8 in the present embodiment, the number of the relay panels 8 can be appropriately changed. The wiring is organized by providing the wire alignment panels 12, which facilitates wiring work and also improves the appearance.

In the present embodiment, a network switch 13 is further mounted on the lowest shelf of the first rack 21. Communication cables (not shown) extending from the respective communication ports 543 (see FIG. 3B) of the first visualization panels 5 are connected to the network switch 13.

Furthermore, a server is also installed in the first building 2 even though it is not shown in the drawings. The server is connected to the network switch 13 via a communication cable, so that the light amount signal received from each first visualization panel 5 through the network switch 13 is sent to the monitoring device 11 via a network such as wide area network.

Description of the Second Building 3

The second visualization panel 6 can be the same panel as the first visualization panel 5. The second visualization panel 6 has plural third optical connector ports 61 to be connected to optical connectors 42 attached to the other ends of the inter-building optical fibers 4, and plural fourth optical connector ports 62 optically connected to the third optical connector ports 61. The third optical connector ports 61 are receptacles of MPO connectors, and the fourth optical connector ports 62 are LC duplex optical connectors with two integrated ports (optical receptacles). The fourth optical connector ports 62 are provided on the front surface of the second visualization panel 6, and the third optical connector ports 61 are provided on the back surface of the second visualization panel 6. The second visualization panel 6 also has second photosensors (not shown) which partially leak light from the inter-building optical fibers 4 and detect the amount of the leaking light. Since the second photosensor has the same configuration as the first photosensor 55 described in reference to FIG. 4, the explanation thereof will be omitted.

As shown in FIG. 2B, a second rack 31 is placed in the second building 3, and seven second visualization panels 6 are mounted on the second rack 31. In other words, one second rack 31 supports three hundred and thirty-six lines. Three second racks 31 having the same configuration as that shown in FIG. 2B are placed in the second building 3 so as to be able to support one thousand inter-building optical fibers 4, even though the illustration is omitted in FIGS. 1A and 1B.

Plural relay panels 15 (for at least three hundred and thirty-six lines) are also mounted on the second rack 31. Wire connectors 151 connected to intra-building wiring as physical wires routed inside the second building 3 are provided on the back surfaces of the relay panels 15, and plural visualization panel-side optical connector ports 152 optically connected to the wire connectors 151 are provided on the front surfaces of the relay panels 15.

When the inter-building optical fiber 4 is not in use, the fourth optical connector port 62 of the second visualization panel 6 is open as shown in FIG. 1A.

Meanwhile, when the inter-building optical fiber 4 is in use, an optical connector (LC connector) 161 at one end of a wire connection optical fiber 16 is connected to the fourth optical connector port 62 of the second visualization panel 6 and an optical connector (LC connector) 162 at the other end of the wire connection optical fiber 16 is connected to the visualization panel-side optical connector port 152 of the relay panel 15, as shown in FIG. 1B. Thus, the intra-building wiring is connected to the inter-building optical fiber 4 via the relay panel 15, the wire connection optical fiber 16 and the second visualization panel 6.

In the present embodiment, the wire alignment panels 12 are also mounted on the second rack 31 to organize the wire connection optical fibers 16 which connect the second visualization panels 6 to the relay panels 15. In the present embodiment, one wire alignment panel 12 is provided for two relay panels 15.

In the present embodiment, a network switch 17 is further mounted on the lowest shelf of the second rack 31. Communication cables (not shown) extending from respective communication ports (not shown) of the second visualization panels 6 are connected to the network switch 17.

Furthermore, a server is also installed in the second building 3 even though it is not shown in the drawings. The server is connected to the network switch 17 on the second rack 31 via a communication cable, so that the light amount signal received from each second visualization panel 6 through the network switch 17 is sent to the monitoring device 11 via a network such as wide area network.

In the present embodiment, an initial value measuring optical power meter 14 is further mounted on the second rack 31 and measures initial values of the amount of monitoring light (leaking light) output from the inter-building optical fibers 4 through the second visualization panels 6. When measuring the initial value of the monitoring light amount, an optical fiber (not shown) extending from the initial value measuring optical power meter 14 is inserted into the fourth optical connector ports 62 of the second visualization panels 6 one by one. The initial value measuring optical power meter 14 is not essential and can be omitted.

Description of the Monitoring Device 11

The monitoring device 11 collectively manages the amount of monitoring (leaking) light of each line detected in the first and second visualization panels 5 and 6 and monitors the status (health) of the inter-building optical fibers 4 based on the light amount in each line. The monitoring device 11 judges the health of the inter-building optical fiber 4 in a given line by, e.g., comparing a difference between the amount of light detected in the first visualization panel 5 and that detected in the second visualization panel 6 (a light amount difference) in the given line with a preset threshold. The monitoring device 11 may be configured to warn when the light amount difference becomes below the threshold. Alternatively, it may be configured that plural threshold ranges are preliminarily set and the monitoring device 11 informs an operator which threshold range the light amount difference falls within.

Although the monitoring device 11 is provided separately from the servers installed in the first and second buildings 2 and 3 in the present embodiment, one of the servers installed in the first and second buildings 2 and 3 may be used as the monitoring device 11.

In addition, the monitoring device 11 may have a function of controlling light emission of the indicator portions 555 of the visualization panels 5 and 6. In this case, for example, faults such as incorrect connection or mistaken removal of optical fiber can be prevented by emitting light (e.g., light with a different color from the colors indicating the communication status) from the indicator portions 555 corresponding to the optical connector ports 52 and 62 of which connection is switched when starting to use lines.

Operation of the Optical Fiber Monitoring System 1

When the inter-building optical fiber 4 is not in use, the light source panel 7 (the light source-side optical connector port 71) is connected to the first visualization panel 5 (the second optical connector port 52) by the light source connection optical fiber 9 and the fourth optical connector port 62 of the second visualization panel 6 is open, as shown in FIG. 1A. Thus, monitoring light from the light source panel 7 reaches the second visualization panel 6 via the first visualization panel 5 and the inter-building optical fiber 4. At this time, the amount of monitoring light (leaking light) detected by the first photosensor 55 of the first visualization panel 5 and the amount of monitoring light (leaking light) detected by the second photosensor of the second visualization panel 6 are sent to the monitoring device 11. It is possible to constantly monitor the health of the inter-building optical fibers 4 by the monitoring device 11 monitoring the light amounts detected in the first and second visualization panels 5 and 6.

To change the status of the inter-building optical fiber 4 from not in use to in use, the light source connection optical fiber 9 is removed and the first visualization panel 5 (the second optical connector port 52) is connected to the relay panel 8 (the visualization panel-side optical connector port 82) by the wire connection optical fiber 10 in the first building 2, as shown in FIG. 1B. Meanwhile, in the second building 3, the second visualization panel 6 (the fourth optical connector port 62) is connected to the relay panel 15 (the visualization panel-side optical connector port 152) by the wire connection optical fiber 16. Thus, the intra-building wirings in the two buildings are connected via the first visualization panel 5, the inter-building optical fiber 4 and the second visualization panel 6, and the line is started to be used. The optical fiber monitoring system 1 in the present embodiment can continuously detect the amount of light even during use of the line and can monitor occurrence of faults or communication status in the inter-building optical fibers 4 all together by the monitoring device 11.

Functions and Effects of the Embodiment

As described above, the optical fiber monitoring system 1 in the present embodiment is provided with the first visualization panels 5 provided in the first building 2 and optically connected to ends of the inter-building optical fibers 4, the second visualization panels 6 provided in the second building 3 and optically connected to the other ends of the inter-building optical fibers 4, and the monitoring light sources 72 provided in the first building 2 to inject monitoring light into the inter-building optical fibers 4, each first visualization panel 5 has the first photosensors 55 which partially leak the monitoring light injected into the inter-building optical fibers 4 from the monitoring light sources 72 and detect the amount of the leaking light, and each second visualization panel 6 has the second photosensors which partially leak light from the inter-building optical fibers 4 and detect the amount of the leaking light.

In this configuration, it is possible to constantly monitor the health of (presence of faults in) the inter-building optical fibers 4 which are not in use (which are on standby). This allows the health of the inter-building optical fibers 4 to be checked without sending workers to the first and second buildings 2 and 3, resulting in facilitating inspection of the inter-building optical fibers 4.

In addition, in the optical fiber monitoring system 1, the status of the inter-building optical fibers 4 can be changed from not in use to in use only by switching connection of the optical fibers 9 and 16 to the visualization panels 5 and 6 and this facilitates work to start using lines (line connection work).

Furthermore, even after starting to use the inter-building optical fibers 4, the optical fiber monitoring system 1 can be continuously used to monitor the state of the communication light (the health of the inter-building optical fibers 4 which are in use).

Modifications

Figure 5A:
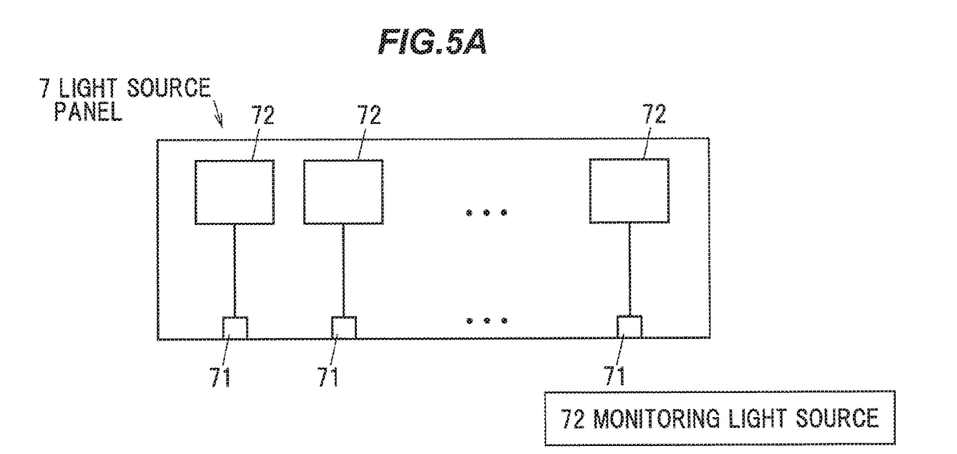
FIG. 5A is a schematic configuration diagram illustrating a light source panel used in the optical fiber monitoring system shown in FIG. 1A.

In the embodiment described above, the number of the monitoring light sources 72 used is the same as the number of lines (the number of the inter-building optical fibers 4 connected to the first visualization panel 5 via the first optical connector ports 51). In this case, in the light source panel 7, one monitoring light source 72 is optically connected to one light source-side optical connector port 71, so the light source-side optical connector ports 71 correspond one-to-one to the monitoring light sources 72 as shown in FIG. 5A. However, the number of the monitoring light sources 72 is not limited to the same as the number of lines. The number of the monitoring light sources 72 may be less than the number of lines so that the cost can be reduced.

Figure 5B:
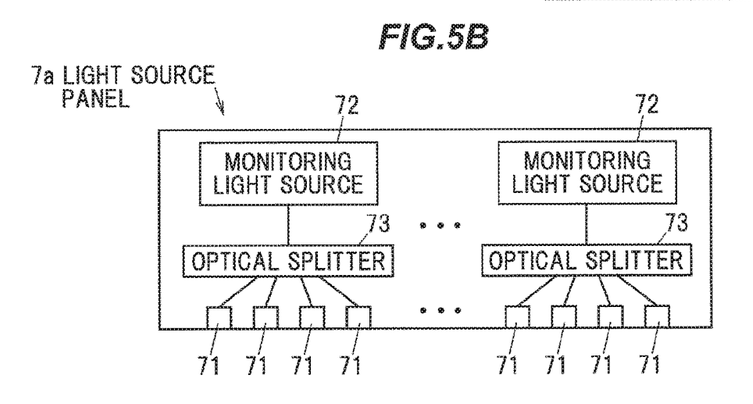
FIGS. 5B and 5C are diagrams illustrating modifications.

For example, an optical splitter 73 for distributing monitoring light from the monitoring light source 72 to plural second optical connector ports 52 may be provided as shown in FIG. 5B. Although FIG. 5B shows an example in which a light source panel 7a incorporating the optical splitters 73 is used so that each optical splitter 73 divides and distributes the monitoring light from the monitoring light source 72 to plural (four in this example) light source-side optical connector ports 71 inside the light source panel 7a, the optical splitters 73 may be provided between the light source panel 7 and the first visualization panel 5.

Figure 5C:
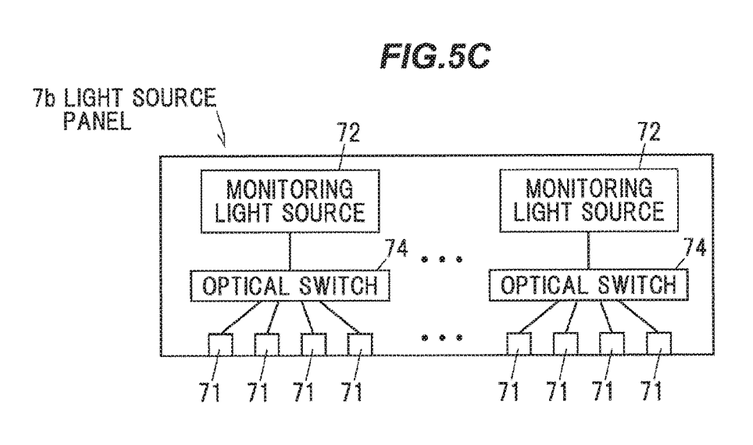

Alternatively, using the monitoring light sources 72 of a smaller number than the lines, optical switches 74 each for switching between the plural second optical connector ports 52 to be optically coupled to the monitoring light source 72 may be provided, as shown in FIG. 5C. Although FIG. 5C shows an example in which a light source panel 7b incorporating the optical switches 74 is used so that a port to be optically coupled to the monitoring light source 72 is switched between the plural (four in this example) light source-side optical connector ports 71 by the optical switch 74 inside the light source panel 7b, the optical switches 74 may be provided between the light source panel 7 and the first visualization panel 5.

Further, although the light source panel 7 provided separately from the first visualization panel 5 has been described in the embodiment, the monitoring light sources 72 may be incorporated in the first visualization panel 5.

Furthermore, when starting to use lines, connection switching work to remove the light source connection optical fiber 9 and connect the wire connection optical fiber 10 is manually carried out in the embodiment but may be automatically carried out.

Figure 6:
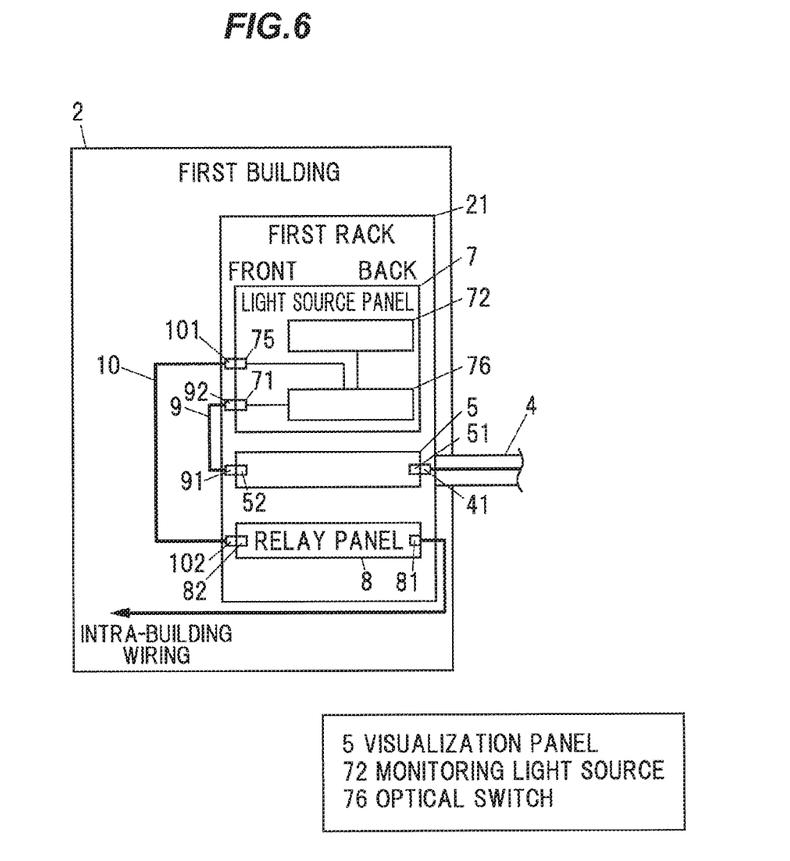
FIG. 6 is a schematic configuration diagram illustrating an optical fiber monitoring system in a modification of the invention.

In this case, an optical switch 76 capable of switching between optical connection of the second optical connector port 52 to the monitoring light source 72 and connection of the second optical connector port 52 to the wire (intra-building wiring) in the first building 2 is further provided in the first building 2 as shown in FIG. 6. In FIG. 6, the optical switch 76 mounted on the light source panel 7 is shown as an example.

When the optical switch 76 is mounted on the light source panel 7, a wire connection optical fiber port 75 to be connected to the optical connector 101 at one end of the wire connection optical fiber 10 extending from the relay panel 8 is provided on the light source panel 7 and the optical switch 76 is configured to be capable of switching between optical connection of the light source-side optical connector port 71 to the monitoring light source 72 and optical connection of the light source-side optical connector port 71 to the wire connection optical fiber port 75.

In the example shown in FIG. 6, when the light source-side optical connector port 71 is optically connected to the monitoring light source 72 by the optical switch 76, monitoring light from the monitoring light source 72 is incident on the second optical connector port 52 of the first visualization panel 5 through the light source connection optical fiber 9. Meanwhile, when the light source-side optical connector port 71 is optically connected to the wire connection optical fiber port 75 by the optical switch 76, one end of the wire connection optical fiber 10 is optically connected to the second optical connector port 52 of the first visualization panel 5 through the light source connection optical fiber 9, and as a result, the wire (intra-building wiring) in the first building 2 is optically connected to the inter-building optical fiber 4 via the light source panel 7 and the first visualization panel 5. The optical switch 76 may not be incorporated in the light source panel 7 and may be, e.g., mounted as an independent panel on the first rack 21. In addition, the optical switch 76 may be configured to control switching based on the instruction of the monitoring device 11. Providing the optical switch 76 eliminates the necessity of work to remove/insert the optical fibers 9 and 10 when starting to use lines and it is thus possible to improve convenience.

Summary of the Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] An optical fiber monitoring system (1) for monitoring an inter-building optical fiber (4) connecting a first building (2) and a second building (3), the optical fiber monitoring system (1) comprising: a first visualization panel (5) provided in the first building (2) and optically connected to an one end of the inter-building optical fiber (4); a second visualization panel (6) provided in the second building (3) and optically connected to an other end of the inter-building optical fiber (4); and a monitoring light source (72) provided in the first building (2) to input a monitoring light into the inter-building optical fiber (4), wherein the first visualization panel (5) comprises a first photosensor (55) that partially leaks the monitoring light inputted into the inter-building optical fiber (4) from the monitoring light source (72) and detects an amount of a leaked light, and wherein the second visualization panel (6) comprises a second photosensor that partially leaks a light from the inter-building optical fiber (4) and detects an amount of the a leaked light.

[2] The optical fiber monitoring system (1) defined by [1], wherein the first visualization panel (5) comprises a plurality of first optical connector ports (51) to be connected to an optical connector (41) attached to the one end of the inter-building optical fiber (4), and wherein the monitoring light source (72) comprises a plurality of monitoring light sources (72) of a same number as the inter-building optical fiber (4) connected to the first visualization panel (5) through the first optical connector ports (51).

[3] The optical fiber monitoring system (1) defined by [1], wherein the first visualization panel (5) comprises a plurality of first optical connector ports (51) to be connected to an optical connector (41) attached to the one end of the inter-building optical fiber (4) and a plurality of second optical connector ports (52) optically connected to the first optical connector ports (51), wherein the number of the monitoring light source (72) is smaller than the number of the inter-building optical fiber (4) connected to the first visualization panel (5) through the first optical connector ports (51), and wherein the optical fiber monitoring system (1) further comprises an optical splitter that divides and distributes the monitoring light from the monitoring light source (72) to the second optical connector ports (52).

[4] The optical fiber monitoring system (1) defined by [1], wherein the first visualization panel (5) comprises a plurality of first optical connector ports (51) to be connected to an optical connector (41) attached to the one end of the inter-building optical fiber (4) and a plurality of second optical connector ports (52) optically connected to the first optical connector ports (51), wherein the number of the monitoring light source (72) is smaller than the number of the inter-building optical fiber (4) connected to the first visualization panel (5) through the first optical connector ports (51), and wherein the optical fiber monitoring system (1) further comprises an optical switch for switching between the second optical connector ports (52) to be optically coupled to the monitoring light from the monitoring light source (72).

[5] The optical fiber monitoring system (1) defined by any one of [1] to [4], further comprising a monitoring device (11) that monitors a state of the inter-building optical fiber (4) based on an amount of the leaked light detected in the first and second visualization panels (5, 6), wherein the first and second visualization panels (5, 6) each comprise a communication port (543) connected to a communication cable, and a transmitter (542) transmitting a signal corresponding to the amount of the leaked light to the monitoring device (11) through the communication port (543).

[6] The optical fiber monitoring system (1) defined by any one of [1] to [5], further comprising a first rack (21) placed in the first building (2), wherein the first visualization panel (5) and a light source panel (7) mounting the monitoring light source (72) are mounted on the first rack (21).

[7] The optical fiber monitoring system (1) defined by [6], wherein a wire alignment panel (12) for organizing an optical fiber (9, 10) connected to the first visualization panel (5) is mounted on the first rack (21).

[8] The optical fiber monitoring system (1) defined by any one of [1] to [7], wherein the first visualization panel (5) comprises a plurality of first optical connector ports (51) to be connected to an optical connector (41) attached to the one end of the inter-building optical fiber (4) and a plurality of second optical connector ports (52) optically connected to the first optical connector ports (51), and wherein the optical fiber monitoring system (1) further comprises an optical switch that is provided in the first building (2) and is capable of switching between optical connection of the second optical connector ports (52) to the monitoring light source (72) and connection of the second optical connector ports (52) to a wire in the first building (2).

[9] The optical fiber monitoring system (1) defined by any one of [1] to [8], further comprising an initial value measuring optical power meter (14) that is provided in the second building (3) to measure an initial value of an amount of the monitoring light outputted from the inter-building optical fiber (4) through the second visualization panel (2).

Although the embodiment of the invention has been described, the invention according to claims is not to be limited to the embodiment. Further, please note that all combinations of the features described in the embodiment are not necessary to solve the problem of the invention. In addition, the invention can be appropriately modified and implemented without departing from the gist thereof.

What is claimed is:

1. An optical fiber monitoring system for monitoring an inter-building optical fiber connecting a first building and a second building, the optical fiber monitoring system comprising:
a first visualization panel provided in the first building and optically connected to an one end of the inter-building optical fiber;
a second visualization panel provided in the second building and optically connected to an other end of the inter-building optical fiber; and
a monitoring light source provided in the first building to input a monitoring light into the inter-building optical fiber,
wherein the first visualization panel comprises a first photosensor that partially leaks the monitoring light inputted into the inter-building optical fiber from the monitoring light source and detects an amount of a leaked light, and
wherein the second visualization panel comprises a second photosensor that partially leaks the monitoring light from the inter-building optical fiber and detects amount of a leaked light.

2. The optical fiber monitoring system according to claim 1, wherein the first visualization panel comprises a plurality of first optical connector ports to be connected to an optical connector attached to the one end of the inter-building optical fiber, and
wherein the monitoring light source comprises a plurality of monitoring light sources of a same number as the inter-building optical fiber connected to the first visualization panel through the first optical connector ports.

3. The optical fiber monitoring system according to claim 1, wherein the first visualization panel comprises a plurality of first optical connector ports to be connected to an optical connector attached to the one end of the inter-building optical fiber and a plurality of second optical connector ports optically connected to the first optical connector ports, wherein the number of the monitoring light source is smaller than the number of the inter-building optical fiber connected to the first visualization panel through the first optical connector ports, and wherein the optical fiber monitoring system further comprises an optical splitter that divides and distributes the monitoring light from the monitoring light source to the second optical connector ports.

4. The optical fiber monitoring system according to claim 1, wherein the first visualization panel comprises a plurality of first optical connector ports to be connected to an optical connector attached to the one end of the inter-building optical fiber and a plurality of second optical connector ports optically connected to the first optical connector ports, wherein the number of the monitoring light source is smaller than the number of the inter-building optical fiber connected to the first visualization panel through the first optical connector ports, and wherein the optical fiber monitoring system further comprises an optical switch for switching between the second optical connector ports to be optically coupled to the monitoring light from the monitoring light source.

5. The optical fiber monitoring system according to claim 1, further comprising a monitoring device that monitors a state of the inter-building optical fiber based on an amount of the leaked light detected in the first and second visualization panels,
wherein the first and second visualization panels each comprise a communication port connected to a communication cable, and a transmitter transmitting a signal corresponding to the amount of the leaked light to the monitoring device through the communication port.

6. The optical fiber monitoring system according to claim 1, further comprising a first rack placed in the first building,
wherein the first visualization panel and a light source panel mounting the monitoring light source are mounted on the first rack.

7. The optical fiber monitoring system according to claim 6, wherein a wire alignment panel for organizing an optical fiber connected to the first visualization panel is mounted on the first rack.

8. The optical fiber monitoring system according to claim 1, wherein the first visualization panel comprises a plurality of first optical connector ports to be connected to an optical connector attached to the one end of the inter-building optical fiber and a plurality of second optical connector ports optically connected to the first optical connector ports, and wherein the optical fiber monitoring system further comprises an optical switch that is provided in the first building and is capable of switching between optical connection of the second optical connector ports to the monitoring light source and connection of the second optical connector ports to a wire in the first building.

9. The optical fiber monitoring system according to claim 1, further comprising an initial value measuring optical power meter that is provided in the second building to measure an initial value of an amount of the monitoring light outputted from the inter-building optical fiber through the second visualization panel.

* * * * *